United States Patent [19]

Olson et al.

[11] Patent Number: 4,513,321

[45] Date of Patent: Apr. 23, 1985

[54] BLACK LEVEL CLAMP FOR TELEVISION SIGNALS

[75] Inventors: Charles L. Olson, Oaklyn; John F. Monahan, Marlton, both of N.J.

[73] Assignee: RCA Corporation, New York, N.Y.

[21] Appl. No.: 437,834

[22] Filed: Oct. 29, 1982

[51] Int. Cl.³ .............................................. H04N 5/18
[52] U.S. Cl. .................................................. 358/172
[58] Field of Search ................................ 358/160, 172

[56] References Cited

U.S. PATENT DOCUMENTS 4,110,787 8/1978 Parker ................................. 358/172

Primary Examiner—Tommy P. Chin
Assistant Examiner—Michael D. Parker
Attorney, Agent, or Firm—Eugene M. Whitacre; Lawrence C. Edelman; William H. Meise

[57] ABSTRACT

A black-level clamp for a signal derived from a transducer such as a camera tube includes a controllable voltage offset generator such as a series capacitor or an amplifier. The television signal is sampled during the horizontal sync interval to produce a control signal indicative of the current black-level signal, and the control signal is applied to adjust the charge on the series capacitor to place one plate at a reference voltage or is compared with a reference level to produce a further control signal for adjusting the offset of the amplifier. In either case, drift of the reference voltage which may perturb the operation of the clamp is reduced by deriving the reference voltage from the television signal at times within the vertical blanking interval.

19 Claims, 4 Drawing Figures

BLACK LEVEL CLAMP FOR TELEVISION SIGNALS

BACKGROUND OF THE INVENTION

This invention relates to a clamp arrangement by which the black level of a television signal can be clamped to a reference voltage.

Prior art black-level clamps for television signals often use a series capacitor together with a gate such as a bipolar transistor, which gate is coupled to the output plate of the capacitor and to a reference voltage or ground. The gate is operated during the horizontal retrace interval to clamp the output plate of the capacitor to a reference voltage derived from the signal during an interval within the horizontal retrace pulse. This allows the capacitor to assume a charge which is retained when the gate is OPEN to produce an offset voltage across the capacitor which clamps the signal level on the output side of the clamp. In television cameras and receivers, the horizontal drive pulse encompasses a time interval during which the electron beam of the camera tube (generally a vidicon) or kinescope is retraced. The retrace is accomplished by a high voltage pulse applied to the deflection yoke to rapidly reverse the current therein. The deflection currents and associated energies are large, and coupling of unwanted signals from the deflection circuits to the signal circuits can occur. Black-level clamps which use a gate operated during the horizontal drive pulses to generate a control signal for an offset voltage generator may have the clamping level perturbed by noise signals which appear not only in the signal paths but on the ground or reference voltage point.

SUMMARY OF THE INVENTION

A clamp arrangement for television signals derived from a transducer includes a controllable offset generator coupled to the signal source and to an output terminal of the offset voltage generator, for establishing an offset voltage therebetween under the control of a clamp control signal. The input and output terminals of the offset voltage generator constitute the input and output terminals of the clamp. A controllable sampler is coupled to the output of the clamp and to a reference potential for generating a clamp control signal which establishes the offset voltage. The sample is taken during an interval encompassing at least a portion of the horizontal retrace interval. Noise perturbs the clamp reference level. A reference voltage generator is coupled to the television signal source for deriving the reference voltage from the television signals under the control of a second sample signal. A second sampling signal generator controls the reference voltage source for sampling at times within the vertical blanking interval and without the horizontal retrace intervals so that the reference voltage is derived from the signal at a time when the voltages are not perturbed by the horizontal retrace pulse noise.

DETAILED DESCRIPTION

Figure 1:
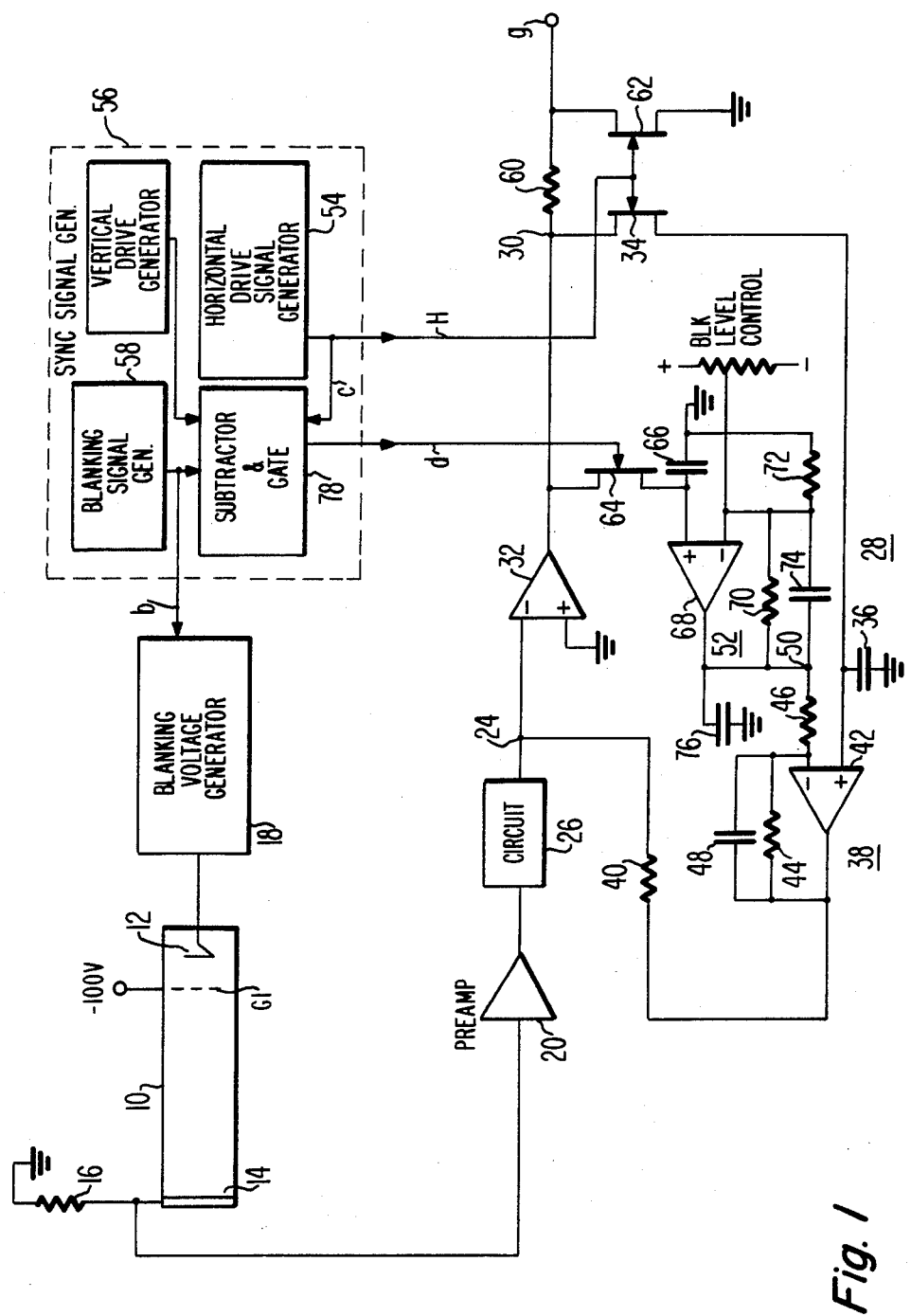
FIG. 1 is a diagram, partially in block and partially in schematic form, of a camera arrangement embodying the invention.

In FIG. 1, a camera tube 10 includes a cathode 12, a G1 grid and a target electrode 14. Target electrode 14 is coupled to a load resistor 16. Operating voltage is applied to cathode 12 from a voltage generator 18 which includes provision for changing the blanking voltage during periodic blanking intervals for blanking or setting to a reference level the output signal derived from the target. The blanking control signals are derived from a blanking signal generator 58, (which is part of sync signal generator 56) and are coupled to generator 18 by a conductor b. A preamplifier circuit 20 is coupled to target 14 for amplifying the television video signal. The output of preamplifier 20 is applied to an input terminal 24 of clamping circuit designated generally as 28 by way of a circuit 26 illustrated as a block, which may include other camera functions but which is not a part of the invention.

Clamp 28 in FIG. 1 has as its input terminal node 24 and as its output terminal node 30. The video signals applied to input terminal 24 are coupled to output terminal 30 by way of an inverting amplifier 32 which acts in conjunction with other circuits to offset the voltage at output terminal 30 relative to that at input terminal 24. The offset voltage is controlled by a degenerative feedback circuit including a gate in the form of a field-effect transistor (FET) 34, a filter or energy storage device including a capacitor 36, a non-inverting filter amplifier designated generally as 38 which generates a control signal, and a resistor 40 which is coupled to input terminal 24 to complete the feedback loop by applying the control signal to amplifier 32. Filter amplifier 38 includes a differential amplifier 42, feedback resistors 44 and 46 and Miller feedback capacitor 48. The reference voltage for filter amplifier 38 is generated at a node 50 by a reference voltage generator 52 in a manner to be described. Gate 34 is operated by horizontal drive signals derived from a horizontal sync signal generator 54 (part of sync signal generator 56) which are coupled to the gate of FET 34 over a conductor H and which also are used for driving the horizontal deflection (not shown). The signals at node 30, clamped by the action of clamp 28, are applied through a resistor 60 to a terminal g, where they are made available to other circuits for further processing or use. Terminal g is periodically coupled to ground by a gate in the form of a FET 62 which is gated into conduction by the horizontal drive pulses on conductor H for performing a final clamping of the black level.

Figure 2:
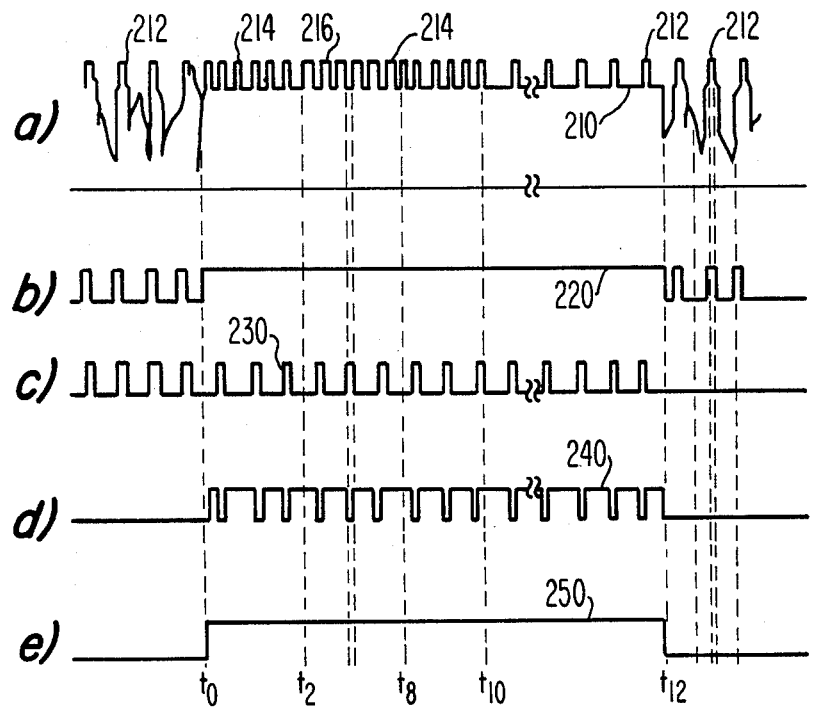
FIG. 2 is a timing diagram aiding in the understanding of the operation of the arrangement of FIG. 1.

Reference voltage generator 52 includes a gate in the form of a FET 64 coupled to node 30 to a storage capacitor 66 and to the non-inverting input terminal of an amplifier 68. Amplifier 68 is operated in a feedback filter mode by resistor 70 and capacitor 74 coupled between its output and inverting input terminals and by a resistor 72 coupled between the inverting input terminal and ground. The output terminal of amplifier 68 is coupled to a further capacitor 76 at node 50. Reference voltage generator 52 samples the signal at particular times to be described to produce a direct reference voltage at node 50 which is compared by filter amplifier 38 with the signal voltage sampled by FET 34 during the horizontal sync intervals. Gating signals are applied to the gate of FET 64 from a subtractor 78 over a conductor d. The operation of reference voltage generator 52 and clamp 28 can be understood by reference to the timing diagrams of FIG. 2. FIG. 2a illustrates as a waveform 210 a composite television signal including: horizontal synchronizing pulses, some of which are illustrated as 212, equalizing pulses, some of which are illustrated as 214; and vertical synchronizing pulses; some of which are designated 216. Waveform 210 is shown as an aid to understanding the timing of the various signals. In the interval $t_0$–$t_{12}$, the horizontal synchronizing, equalizing and vertical synchronizing pulses are superimposed upon a vertical blanking signal. Interval $t_0$–$t_2$ is the first equalizing pulse interval, $t_2$–$t_8$ is the vertical sync pulse interval, while $t_8$–$t_{10}$ represents the second equalizing pulse interval. The interval $t_0$–$t_{12}$ is established by blanking signal generator 58 which generates a blanking pulse train on conductor B which is illustrated as 220 in FIG. 2b. The horizontal blanking pulses are somewhat wider than sync pulses 212. Vertical signal 250 is applied as an input to subtractor 78 which may take the form of an inverter and an AND gate (not shown). Horizontal drive signal generator 54 generates horizontal drive signals 230 which are also applied to subtractor 78 over a conductor c. The drive signals applied over conductor c to subtractor 28 are effectively subtracted from vertical drive signal 250 to produce signals illustrated as 240 in FIG. 2d. As mentioned, these signals are applied to the gate of FET 64 over conductor d. Signal 240 includes pulses having positive excursions (corresponding to a logic one level) during those portions of the vertical blanking interval during which horizontal sync pulses do not occur. In effect, pulses 240 occur during those times which would be active video times were it not for the blanking effect of the application of the vertical component of the blanking voltage to cathode 12 in the interval $t_0$–$t_{12}$.

In operation, FET 64 samples the signal values during or within the vertical blanking interval, but only at times other than the time (without the time) of the horizontal synchronizing pulses. Consequently, FET 64 samples the blanked video signal during the normally active portion of each horizontal line during the vertical blanking interval. Consequently FET 64 samples an essentially constant voltage unperturbed by noise resulting from the horizontal retrace periods. The signal thus sampled by FET 64 is stored by capacitor 66 from field to field of the television signal. The voltage across capacitor 66 is applied to filter amplifier 52 which establishes the direct reference voltage at node 50, which may be different from the voltage across capacitor 66 according to the gain of amplifier 52. The reference voltage at node 50 is compared with that portion of the signal sampled by FET 34 during each horizontal blanking pulse, which portion is filtered or stored by capacitor 36.

The result of the comparison is applied to the inverting input terminal of amplifier 32 to generate an offset voltage tending to maintain the black level during the active portion of the signal equal to the reference voltage. Since the reference voltage is derived from the signal at times when it is not perturbed by retrace pulse noise, the system is stabilized.

Figure 3:
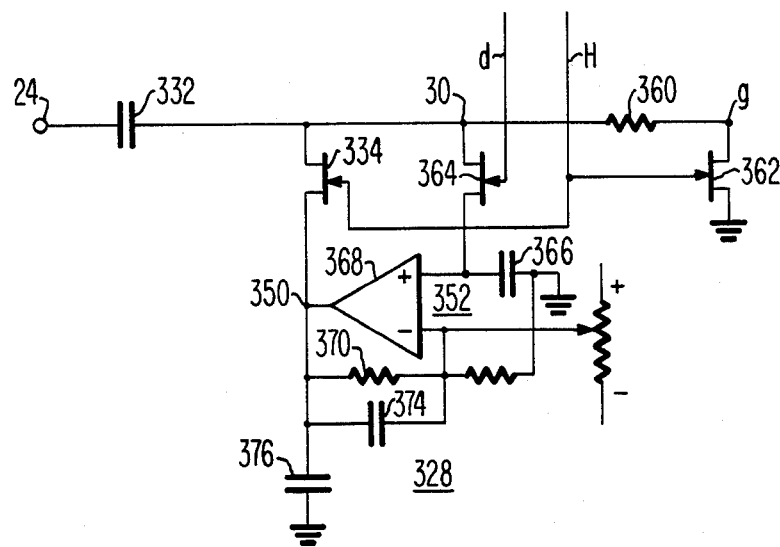
FIG. 3 is a schematic diagram of a second embodiment of a clamp circuit according to the invention.

FIG. 3 illustrates an embodiment of the invention including a series capacitor 332 coupled between input terminal 24 of the clamp and output terminal 30. In FIG. 3, those elements corresponding to elements in FIG. 1 are designated by the same reference numeral in the 300 series. In FIG. 3, the reference voltage is established by a reference voltage generator designated generally as 328 which includes a FET 364 coupled to node 30. FET 364 receives signals 240 over conductor d to enable the gate during portions of the vertical blanking interval not including the horizontal synchronizing pulse interval. Signal samples are applied by gate 364 to a storage capacitor 366 to form a direct voltage. The direct voltage is applied to the non-inverting input of an amplifier 368 having feedback resistor 370 and feedback capacitor 374. A capacitor 376 filters the output voltage of amplifier 368 to form a reference voltage at node 350. A FET 334 operated at the horizontal rate by horizontal drive signals applied thereto over a conductor H periodically couples that plate of capacitor 332 connected to node 30 to the reference voltage at node 350. Each time FET 334 conducts, a control current flows in FET 334 and the voltage across capacitor 332 is adjusted to maintain the black level of the signal equal to the reference voltage on node 350. Thus, capacitor 332 will generally have an offset voltage determined by the control current flow in response to the reference voltage. As in FIG. 1, the signal may be coupled to an output terminal g by way of a resistor 360 and may be further clamped and crushed, if desired, by a horizontal rate clamp 362. This clamping and crushing establishes the retrace interval at true ground which facilitates clamping in later stages. Naturally, the reference voltage levels may be used if convenient or for special video effects.

Figure 4:
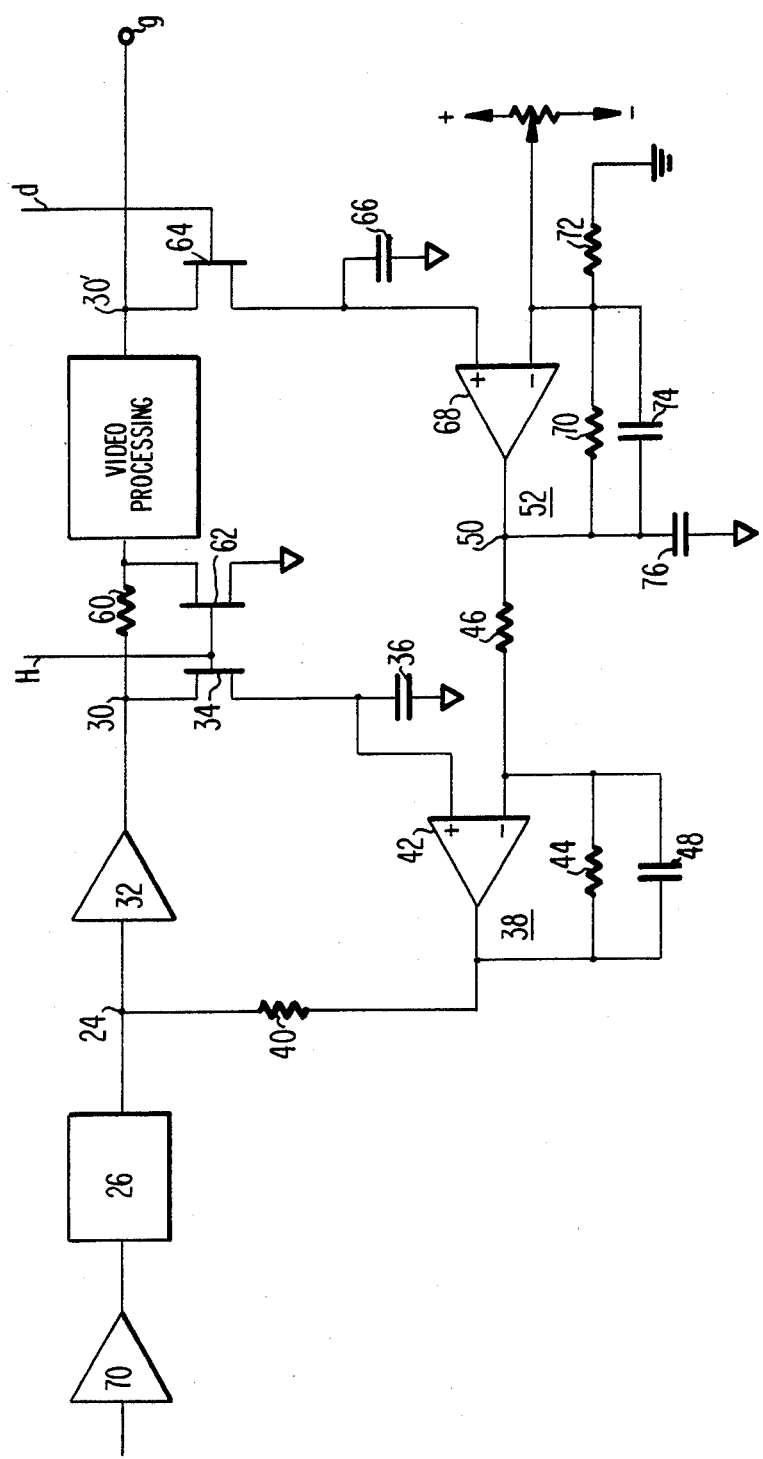
FIG. 4 is another embodiment of the invention in which video processing circuitry is interposed between the sampling points for the clamp and reference voltage generator.

FIG. 4 illustrates an alternative embodiment of the invention adapted to be coupled between target 14 and output terminal g of FIG. 1. Elements corresponding to those of FIG. 1 are designated by the same reference numbers. Comparison with FIG. 1 shows that a video processing block 410 has been added between resistor 60 and output terminal g, and the sampling point for reference generator 52 has been moved from 30 to 30', following the newly added video processing block 410. With this change, the reference samples are derived from a point downstream of the video processing so as to correct errors arising at any point in the video processing, while having the advantage of a clean horizontal interval throughout the video processing steps. The video processor may include gamma or aperture correction, linear matrixing and or such transmission processing as radio-frequency or triax links and cable equalizers.

While the illustrated embodiments use only those portions of the vertical interval without the horizontal retrace intervals, this requires generation of sampling waveforms as described which operate the reference voltage sampler including means for generating sampling pulses during the "active" portions of the vertical blanking. It is possible to simplify the waveform generation and to achieve almost all of the advantages of the described embodiments by deriving the reference voltage from the entire vertical blanking interval. Even though noise pulses occur during the horizontal retrace intervals occurring during the vertical blanking interval, the average voltage over the entire interval will not be excessively perturbed because of the relatively small-time duration (about 10%) of the noise caused by the horizontal retrace pulse, and also because the noise pulse tends to be the derivative of the horizontal retrace pulse, which derivative has both positive and negative-going portions.

Other embodiments of the invention will be obvious to those skilled in the art. In particular, the number and gain of the filter amplifiers used will depend upon the desired loop gain. The reference voltage may be derived from the signal during only a single horizontal line or a few horizontal lines in the vertical blanking interval, rather than being derived from many such lines as in the embodiments.

What is claimed is:

1. An improved clamp arrangement for television signals derived from a source of television signals, comprising:

controllable offset voltage generating means coupled between said source of television signals and an output terminal for establishing an offset voltage therebetween under the control of a clamp control signal, to thereby generate clamped television signals;

first controllable sampling means coupled to said output terminal and operatively associated with a source of reference voltage for generating said clamp control signal for establishing said offset voltage, said first controllable sampling means generating said clamp control signal under the control of a first sampling control signal during an interval encompassing at least portions of recurrent horizontal retrace intervals of said television signal, whereby noise components may perturb the reference voltage provided by said source of reference voltage and cause said clamped television signals to drift;

wherein the improvement comprises said source of reference voltage including:

controllable reference voltage generating means coupled to said source of television signals for deriving said reference voltage from said television signals under the control of a second sampling control signal; and second sampling control signal generating means coupled to said controllable reference voltage generating means for generating second sampling control signals at times within the vertical blanking interval of said television signals, but only at times other than the times of said horizontal retrace intervals, whereby said reference voltage is not perturbed by noise and said clamped television signal does not drift.

2. A clamp according to claim 1 wherein said source of television signals is a camera, and said camera is blanked during said vertical blanking interval thereby producing a signal which remains substantially constant during the times of occurrence of said second sampling control signals.

3. A clamp arrangement according to claim 1 wherein said controllable offset voltage generating means comprises inverting amplifying means, an input terminal of which is coupled to said source of television signals.

4. A clamp arrangement according to claim 1 wherein said first controllable sampling means comprises:

controllable gate means coupled to said output terminal;

horizontal rate signal generating means for generating said first sampling control signal; and coupling means coupled to said controllable gate means, to said reference voltage source, and to said input terminal of said controllable offset voltage generating means for forming a degenerative feedback loop for establishing said offset voltage.

5. A clamp arrangement according to claim 4 wherein said coupling means further comprises:

energy storage means coupled to a point of reference potential and to said controllable gate means for storing said clamp control signal from one horizontal line of said television signal to the next.

6. A clamp as in claim 1 wherein said controllable reference voltage generating means comprises:

controllable gate means coupled to said output terminal and to said second sampling control signal generating means for gating to an output of said controllable gate means samples of said television signal under the control of said second sampling control signals; and energy storage means coupled to said output of said controllable gate means for storing said reference voltage from field to field of said television signal.

7. A clamp as in claim 6 wherein:

said controllable offset voltage generating means comprises capacitance means, and said first controllable sampling means comprises second gating means coupled to said reference voltage and to said output terminal for conducting current through said second gating means under the control of said second sampling control signal generating means to tend to set the voltage on the plate of said capacitance means proximate said output terminal to said reference voltage to thereby establish said offset voltage.

8. A clamp as in claim 1 wherein said second sampling signal generating means comprises:

vertical blanking signal generating means;

horizontal drive pulse generating means; and subtracting means coupled to said vertical blanking signal generating means and to said horizontal drive pulse generating means for taking the difference between said blanking signal and said horizontal drive pulses to form said second sampling control signal.

9. A clamp as in claim 1 wherein:

said controllable offset voltage generating means comprises capacitance means, and said first controllable sampling means comprises second gating means coupled to said reference voltage and to said output terminal for conducting current through said second gating means under the control of said second sampling control signal generating means to tend to set the voltage on the plate of said capacitance means proximate said output terminal to said reference voltage to thereby establish said offset voltage.

10. An improved clamp arrangement for television signals derived from a source of television signals, comprising:

controllable offset voltage generating means coupled between said source of television signals and an output terminal for establishing an offset voltage therebetween under the control of a clamp control signal, to thereby generate clamped television signals;

first controllable sampling means coupled to said output terminal and operatively associated with a source of reference voltage for generating said clamp control signal for establishing said offset voltage, said first controllable sampling means generating said clamp control signal under the control of a first sampling control signal during an interval encompassing at least portions of recurrent horizontal retrace intervals of said television signal, whereby noise components may perturb the reference voltage provided by said source of reference voltage and cause said clamped television signals to drift;

wherein the improvement comprises said source of reference voltage including:

controllable reference voltage generating means coupled to said source of television signals for deriving said reference voltage from said television signals under the control of a second sampling control signal; and second sampling control signal generating means coupled to said controllable reference voltage generating means for generating second sampling control signals at times within the vertical blanking interval of said television signals whereby said reference voltage is not perturbed by noise and said clamped television signal does not drift.

11. A clamp according to claim 10 wherein said source of television signals is a camera, and said camera is blanked during said vertical blanking interval thereby producing a signal which remains substantially constant during the times of occurrence of said second sampling control signals.

12. A clamp arrangement according to claim 10 wherein said controllable offset voltage generating means comprises inverting amplifying means, an input terminal of which is coupled to said source of television signals.

13. A clamp arrangement according to claim 12 wherein said first controllable sampling means comprises:

controllable gate means coupled to said output terminal;

horizontal rate signal generating means for generating said first sampling control signal; and coupling means coupled to said controllable gate means, to said reference voltage source, and to said input terminal of said inverting amplifying means for forming a degenerative feedback loop for establishing said offset voltage.

14. A clamp arrangement according to claim 13 wherein said coupling means further comprises energy storage means coupled to said controllable gate means for storing a signal related to said clamp control signal for times which are long relative to the duration of horizontal lines of said television signal.

15. A clamp in claim 10 wherein said controllable reference voltage generating means comprises:

controllable gate means coupled to said output terminal and to said second sampling control signal generating means for gating to an output of said controllable gate means during at least a portion of each vertical blanking interval a signal representative of said television signals derived from said source of television signals; and energy storage means coupled to said output of said controllable gate means for forming said reference voltage under the control of said second sampling control signal.

16. A clamp as in claim 10 wherein said second sampling control signal generating means further comprises:

vertical blanking interval signal generating means for generating a vertical blanking interval signal during at least a portion of the vertical blanking interval;

horizontal rate signal generating means; and subtracting means coupled to said vertical blanking interval signal generating means and to said horizontal rate signal generating means for forming said second sampling control signals for controlling the operation of said controllable reference voltage generating means for deriving said reference voltage during times within said portion of said vertical blanking interval, but only at times other than the times of the horizontal retrace intervals.

17. A clamp as in claim 16 wherein said horizontal rate signal generating means generates horizontal drive signals, whereby said controllable reference voltage generating means is operated at times within said portion of said vertical blanking interval, but only at times other than the times of said horizontal drive signals.

18. An improved clamp arrangement for a television signal processing system, comprising:

a source of television signals including, the television signals including recurrent vertical blanking intervals, horizontal retrace intervals and active intervals;

a source of reference potential;

controllable offset voltage generating means coupled between said source of television signals and an output terminal for establishing an offset voltage therebetween under the control of a clamp control signal, to thereby generate clamped television signals;

first controllable sampling means coupled to said output terminal and operatively associated with said source of reference potential for generating said clamp control signal for establishing said offset voltage, said first controllable sampling means generating said clamp control signal under the control of a first sampling control signal during an interval encompassing at least portions of said recurrent horizontal retrace intervals;

video processing means coupled to said output terminal for processing said clamped television signals to produce processed, clamped television signals;

wherein the improvement lies in that:

said source of reference potential is controllable and is coupled to said processed, clamped television signals for deriving said reference potential therefrom under the control of a second sampling control signal;

and said improvement further comprises:

second sampling control signal generating means coupled to said controllable source of reference potential for generating said second sampling control signal occurring during at least a portion of each of said vertical blanking intervals for operating said controllable source of reference potential for deriving said reference potential from said processed, clamped television signals during times during which said processed, clamped television signal is likely to have reduced noise.

19. An arrangement as in claim 18 wherein said second sampling control signal generating means further comprises subtracting means and horizontal rate signal generating means for forming said second sampling control signal such that it excludes portions related to horizontal-rate signals.

* * * * *